(No Model.)
D. W. McLAUGHLIN.
COMBINED WEIGHING AND ADVERTISING DEVICE.
No. 475,968. Patented May 31, 1892.
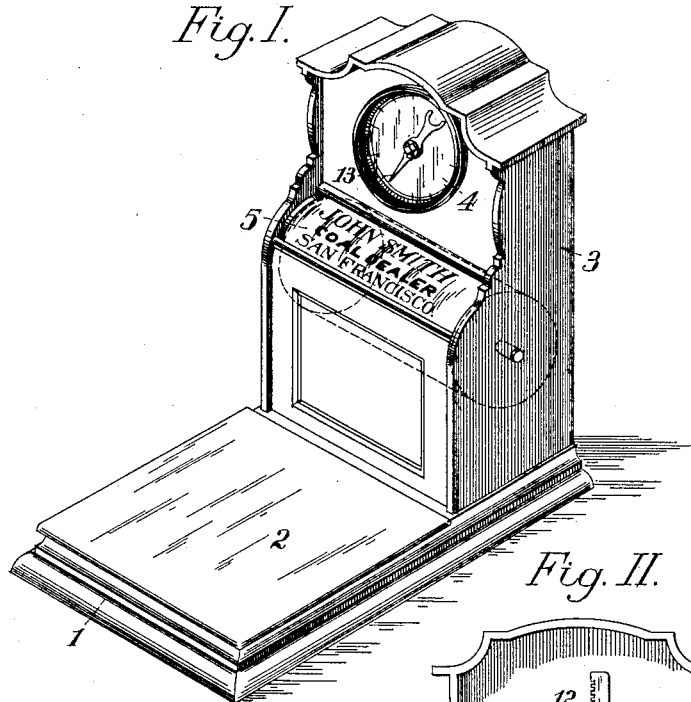
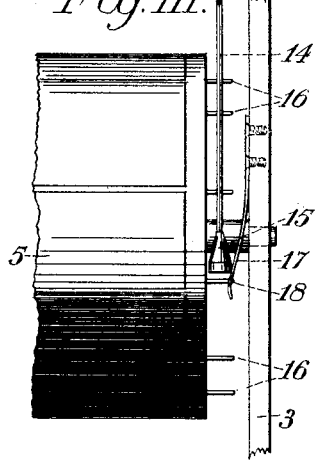
Witnesses:
E. A. Brandau
W. D. Bent Jr.
Inventor:
Dennis W. McLaughlin
By his Atty
John Richards

UNITED STATES PATENT OFFICE.

DENNIS W. McLAUGHLIN, OF SAN LEANDRO, CALIFORNIA.

COMBINED WEIGHING AND ADVERTISING DEVICE.

SPECIFICATION forming part of Letters Patent No. 475,968, dated May 31, 1892.

Application filed April 13, 1891. Serial No. 388,790. (No model.)

*To all whom it may concern:*

Be it known that I, DENNIS W. McLAUGHLIN, residing at San Leandro, county of Alameda, and State of California, have invented certain new and useful Improvements in Combined Weighing and Advertising Devices; and I declare the following specification and drawings to be a full and exact specification of my invention.

This invention relates to apparatus to be exposed in public places for indicating the weight of people and at the same time exposing, successively, advertisements so arranged that each time the apparatus is used a new advertisement in a series will be plainly exposed to view.

My invention consists in the employment of a platform-scale of common construction connected with an indicating-dial to show the weight of a person standing on the scale, the mechanism of the scale and dial being connected to a revolving cylinder, either round or polygonal, on which are mounted advertisements of some definite number, so that each time the scale is used or the weight of a person registered a new advertisement in the series will be turned to the front and exposed to plain view.

Referring to the drawings, Figure I is a perspective view of one of my improved devices. Fig. II is a rear view of the same, showing the mechanism for connecting the platform to the dial and actuating the display-cylinder, on which advertisements are mounted. Fig. III is a detail showing to an enlarged scale the mechanism for turning and locking the advertising-cylinder.

In constructing my improved advertising and weighing apparatus I employ a main or base frame 1, on which is mounted a common scale-platform 2 and an upright inclosed case 3, within which is placed the actuating mechanism of the indicating-dial 4 and the advertising-cylinder 5. The platform 2 is mounted on levers in the usual manner, connecting to one main lever 6, Fig. II, extending out under the case 3 and which is in turn connected by a rod 7 to the lever 8, pivoted at 9. The upward movement of this lever 8 is opposed by a coil-spring 10, which permits the lever to rise with a range proportionate to the load upon the platform 2. Near the middle of this lever is attached a tooth-rack 11, which engages a pinion 12 on the axis of the pointer 13, (shown in Fig. I,) so that the movement of the lever 8, and consequently the load on the platform 2, is indicated on the dial 4. At the end of the lever 8 is attached a rod 14 and at the lower end of this is a conical foot-piece 15. When the weight is removed from the platform 2, the spring 10 forces down the lever 8, and the foot-piece 15, coming in contact with the pins 16 on the cylinder 5, turns it one space or one division to bring a new page of the advertising matter in view, as shown in Fig. I.

To hold the cylinder 5 in position during the upward stroke of the lever 8 or during the intervals between people stepping on the platform 2, I employ a spring 17, with a perforation at 18, into which fit the pins 16. The spring 17 is released by means of the conical end 15 of the rod 14, which, on descent of the lever 8, passes between the end of the cylinder 5 and the spring 17, pushing the latter back and releasing the pin engaged. The foot-piece 15 then comes in contact with the pin released and turns the cylinder 5 through one space until the next pin 16 enters the spring 17. On the upward stroke of the lever 8 and the rod 14 the conical form of the foot-piece 15 causes it to swing out of the way and pass the engaged pin on the upstroke.

Instead of mounting advertisements directly on the cylinder 5, the same effect will result if an endless chain or series of advertisements is employed, rotating with and by means of the cylinder, the display at the front remaining the same by either method.

The actuating mechanism I have shown in its most simple form, and it is evident that various modifications of it could be made to accomplish the same purpose. I do not, therefore, confine myself to the construction shown or to the particular method described of operating the pointer 13 or the advertising-cylinder 5.

Having thus explained the nature and objects of my invention, what I claim as new, and desire to secure by Letters Patent, is—

1. The combination of platform 2, horizontal vibrating lever 8, cylinder 5, journaled at each end in the main frame, rod 14, connected to one end of lever 8 and with its other end arranged to act on cylinder 5, so as to impart a rotative movement thereto at a proper time, and spring 10, connected to the casing and to the lever 8, so as to bear downward on said lever, substantially as described.

2. In a combined weighing and advertising machine, the combination of the weighing-platform, the rotative advertising-cylinder or equivalent device, and a pivoted lever, which connects at one end to the levers belonging to the weighing-platform and is provided at the other end with a depending rod provided with a conical foot-piece, that acts upon projecting pins on the end of the advertising-cylinder, together with the spring 17, substantially as described.

3. The combination, with the weighing-scale 2, the indicating-dial 4, and the lever 8, together with the other parts of the mechanism, whereby a weight upon the platform 2 is indicated by the dial, of the rotating cylinder 5, provided on one end with projecting pins, and the rod 14, connected to one end of the lever 8 and having at its other end a conical foot-piece 15, and the spring 17, arranged to engage the pins on the end of the cylinder, substantially as described.

In testimony whereof I have hereunto affixed my signature in the presence of two witnesses.

DENNIS W. McLAUGHLIN.

Witnesses:
ALFRED A. ENQUIST,
G. W. SULLIVAN.